Figure 1:
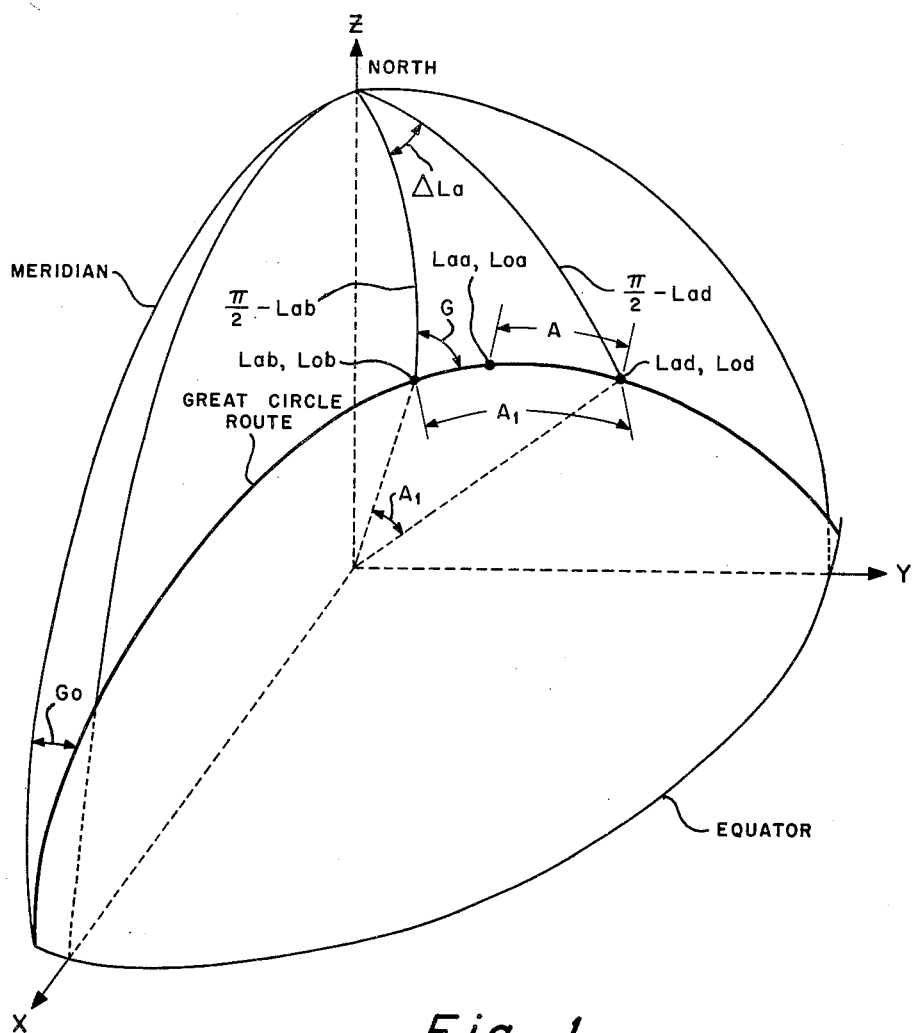

Aug. 14, 1962  C BECK  3,049,299
GREAT CIRCLE NAVIGATION COMPUTER
Filed June 2, 1959  3 Sheets-Sheet 1

INVENTOR.
CYRUS BECK
BY
AGENT

United States Patent Office 3,049,299
Patented Aug. 14, 1962

3,049,299
GREAT CIRCLE NAVIGATION COMPUTER
Cyrus Beck, 1855 Brentwood Road, Abington, Pa.
Filed June 2, 1959, Ser. No. 817,693
18 Claims. (Cl. 235—188)
(Granted under Title 35, U.S. Code (1952), sec. 266)

The invention described herein may be manufactured and used by or for the Government of the United States of America for governmental purposes without the payment of any royalties thereon or therefor.

The present invention relates to an analog computer for performing computations ordinarily incident to the navigation of a dirigible craft.

One of the foremost problems incident to the navigation of a dirigible craft, such as an aircraft, is the high speed and accurate computation of complex equations in order to accurately navigate the aircraft over long distances at relatively high speeds although some of the data is constantly changing. The rapid change in craft position necessitates that the computations be made rapidly and presented in a readily usable form.

It is contemplated that the present invention will provide, in readily usable form, the necessary information for permitting a dirigible craft to be steered in a great circle path from one place to another where the latitudes and longitudes of the places, the speed of the craft, and the shifts in wind direction and magnitude are all known. It is further contemplated that the actual latitude-longitude position of the craft, as well as the distance from the base and to the destination relative to the actual present position of the craft, will be presented at all times.

One of the principal objects of the invention, therefore, is the provision of computer means for performing the necessary computations and displaying the results thereof in such a manner that a dirigible craft can be readily navigated along a great circle route from a base to a destination where the latitudes and longitudes thereof are known, and at the same time computing and displaying the actual position of the craft as to latitude and longitude, the distance traveled, and the remaining distance to the destination.

Another object of the invention is the provision of an analog computer capable of automatically computing and displaying the true ground speed of a dirigible craft, the true heading to hold, the actual latitude-longitude position of the craft, the angle between the computed great circle route and North, the distance traveled, the distance remaining to be traveled, and the total route distance.

Yet another object of the invention is the provision of an analog computer as set forth in the preceding object wherein the computations are performed from data consisting of the established latitude-longitude positions of the base and the destination, and the variable consisting of the true air speed of the craft, and the wind's direction and velocity.

A still further object of the invention is the provision of an analog computer capable of automatically solving two spherical triangle equations, two latitude-longitude equations, and two ground track equations for respectively establishing a great circle route between two places of known location, the actual instantaneous position of a craft along the great circle route, and the ground speed at which the route is being traveled.

Another object of the invention is the provision of an analog computer as set forth in the preceding object which automatically and substantially simultaneously solves the following equations:

(1) $\sin G \sin A = \sin(Lod - Loa) \cos Lad$ (2) $\cos A = \sin Laa \sin Lad$
$+ \cos Laa \cos Lad \cos(Lod - Loa)$ (3) $Laa = Lab + \tfrac{1}{60} \int V g \cos G \, dt$ (4) $Loa = Lob + \tfrac{1}{60} \int V g \sin G \sec Laa \, dt$ (5) $Va \cos(H-G) + Vw \cos(Dw-G) = Vg$ and (6) $Va \sin(H-G) + Vw \sin(Dw-G) = 0$ where $G$ is an angle subtended from the craft's present position, between a great circle route and true North; $A$ is the length of a great circle arc between a present position and a destination; $Lab$ and $Lob$ are the base latitude and longitude, $Laa$ and $Loa$ are the actual present position latitude and longitude, $Lad$ and $Lod$ are the destination latitude and longitude, $Vg$ is the ground velocity magnitude, $Va$ is the true air velocity magnitude, $H$ is the heading to hold in order to compensate for wind drift, and $Vw$ and $Dw$ are the wind velocity magnitude and direction.

Yet another object of the invention is to provide a computer as set forth in the preceding paragraph capable of also simultaneously solving the following equations: (1) $Dad = 60A$; and (2) $Dab = Dbd - Dad$; where $Dad$ is the instantaneous actual distance remaining to be traveled to a destination, $Dbd$ is the great circle route distance between a base and the destination; and $Dab$ is the distance traveled.

Figure 2:
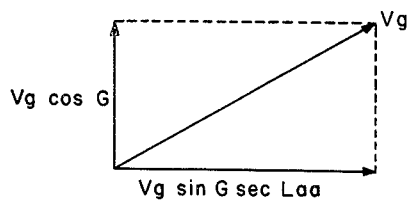
Figure 3:
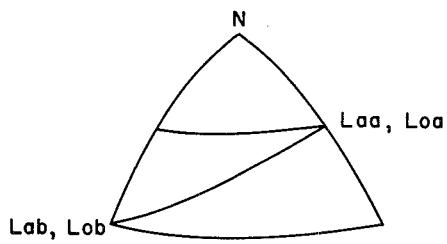
Figure 4:
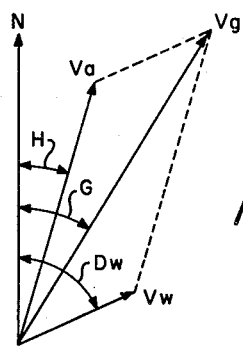
Figure 5:
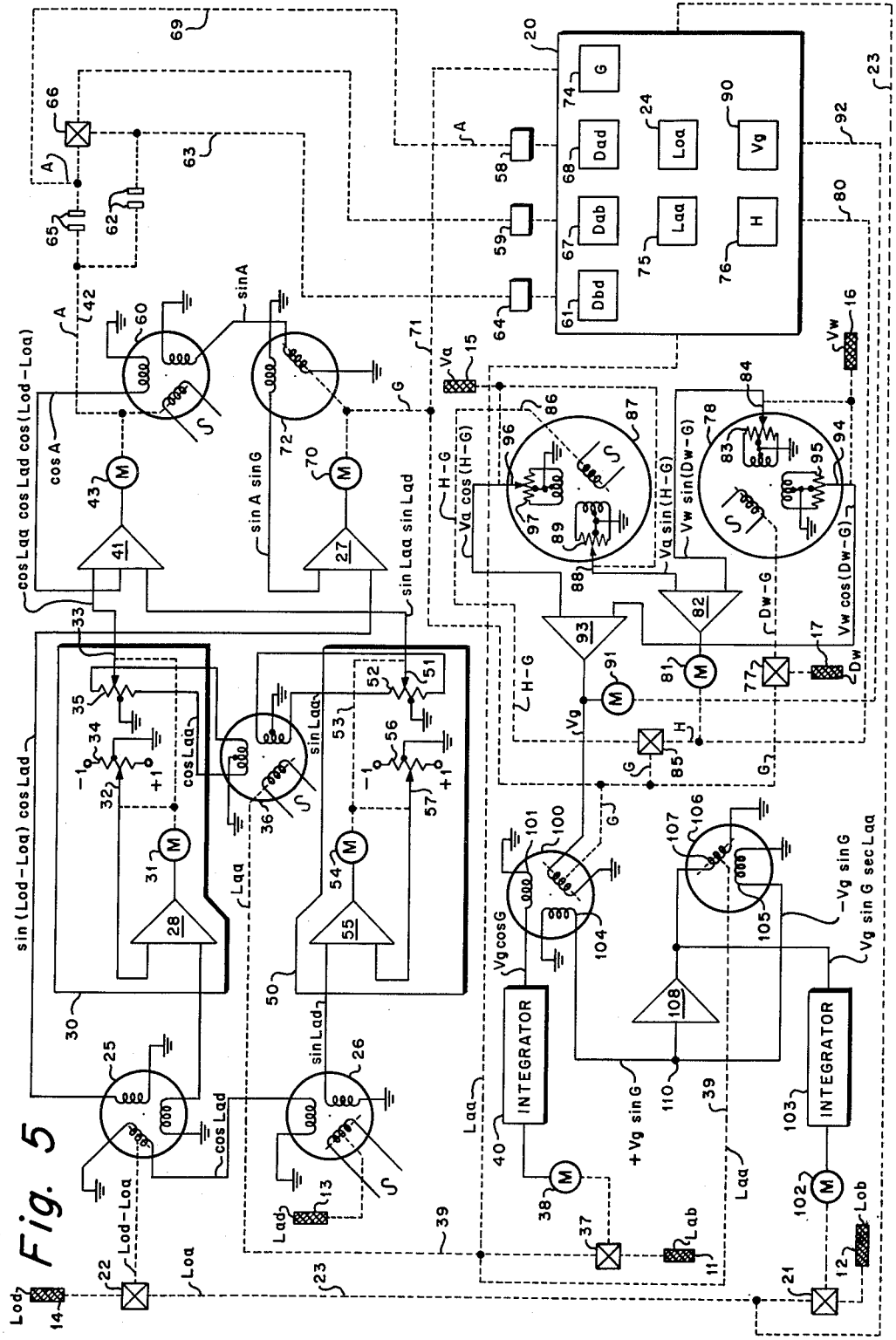

The invention further resides in certain novel features of construction, combinations and arrangements of parts, and further objects and advantages of the invention will be apparent to those skilled in the art to which it pertains from the following description of the present preferred embodiment thereof, described with reference to the accompanying drawings in which similar reference characters represent corresponding parts throughout the several views, and in which FIG. 1 represents a spherical triangle drawn on the surface of the earth, for use in explaining the navigational equations underlying the operation of this invention;

FIGS. 2, 3, and 4 are geometrical sketches useful for pictorially illustrating certain phases of problems to be solved by the invention; and FIG. 5 is a detailed schematic drawing of the computer circuit arrangement and display panel embodying the invention in which the arrows indicate the direction of the information, the lines being broken for mechanical control and solid for electrical control.

It is to be understood that the invention is not limited to the details of construction and arrangements of parts shown in the drawings and hereinafter described in detail, but is capable of being otherwise embodied and of being practiced and carried out in various ways. It is to be further understood that the phraseology or terminology employed herein is for the purpose of description and there is no intention to herein limit the invention beyond the requirements of the prior art.

Referring to FIG. 1, a great circle route is shown imposed on a sphere representative generally of the shape of the planet earth, the sphere having three dimensional coordinates indicated by X, Y, Z. The Z coordinate represents the rotational axis of the earth and is also referred to, for theoretical purposes, as a true North and South directional vector. Each of the X, Y, Z coordinates theoretically intersect at the earth's center. An equator, represented by a horizontal arcuate line, intersects the X, Y coordinates at a distance from the earth's center approximating the radius of the earth, the distance above the surface of the earth being considered immaterial. A meridian, represented by an arcuate line intersecting the equator and the Z coordinate, is of approximately $\pi/2$ radians in length.

The selected path of a vehicle, for purpose of illustrating the operation of the invention, is a segment $A_1$ of an arbitrarily selected great circle route. The segment $A_1$ extends between a base having a latitude $Lab$ and a longitude $Lob$ and a destination having a latitude $Lad$ and a longitude $Lod$. The instantaneous actual position of the vehicle at any time is a latitude $Laa$ and a longitude $Loa$. The actual distance remaining to be traveled to the destination along the great circle route is A, which is measured in degrees. Since each minute is one nautical mile, the remaining distance to the destination $Dab$, in nautical miles, is 60A. More particularly (1) $$Dad = 60 A$$

and (2) $$Dab = Dbd - Dad$$

where: $Dab$ is the instantaneous distance between the vehicle and the base; $Dbd$ is the constant distance between the base and the destination; and $Dad$ is the instantaneous distance between the vehicle and the destination.

A spherical triangle is formed by drawing arcuate lines from the North pole where the meridian intersects the Z coordinate to the base position $Lab$, $Lob$ and to the destination $Lad$, $Lod$, the lengths of the lines respectively being $\pi/2 - Lab$ radians and $\pi/2 - Lad$ radians. The lines subtend an angle of $\Delta La$ while the great circle route path segment $A_1$ and line $\pi/2 - Lab$ subtend an angle G between the great circle route and true North.

True North is used throughout for purpose of simplicity, the magnetic variation of North can be incorporated into the invention or compensated for in a desired manner.

By using the laws of sines and cosines, the following equations are formulated for the purpose of solving the spherical triangle having a base leg length of A.

(3) $$\sin G \sin A = \sin (Lod - Loa) \cos Lad$$

and (4) $$\cos A = \sin Laa \sin Lad + \cos Laa \cos Lad \cos (Lod - Loa)$$

The Equation 3 and 4 are incapable of being solved without the actual instantaneous latitude-longitude position of the vehicle being known, it being understood that the latitude-longitude positions of the base and the destination are known.

The rates of change of latitude-longitude position is given by (5) $$\frac{d}{dt} Laa = Vg \cos G$$

and (6) $$\frac{d}{dt} Loa = Vg \sin G \sec Laa$$

where $Vg$ is the magnitude in knots of the vehicle's ground velocity, and $$\frac{d}{dt} Laa, \frac{d}{dt} Loa$$

are in minutes per second and represent the rate of change in latitudes and longitudes of the craft traveling the computed great circle route.

Equations 5 and 6 are obtained by resolving the vector diagram in FIG. 2 and the spherical triangle in FIG. 3.

By integrating Equations 5 and 6 the following latitude-longitude equations are obtained:

(7) $$Laa = Lab + \tfrac{1}{60} \smallint Vg \cos G \, dt$$

and (8) $$Loa = Lob + \tfrac{1}{60} \smallint Vg \sin G \sec Laa \, dt$$

True ground speed $Vg$ can be calculated when the true airspeed $Va$ and the prevailing wind conditions are known, the wind speed $Vw$ and direction $Dw$ as well as the true air speed $Va$ can be obtained in a conventional manner and supplied to the computer diagrammatically shown in FIG. 5. Based upon the diagram shown in FIG. 4, the following ground track equations are obtained for determining the true ground speed $Vg$.

(9) $$Va \cos (H-G) + Vw \cos (Dw - G) = Vg$$

and

(10) $$Va \sin (H-G) + Vw \sin (Dw - G) = 0$$

The true airplane heading H to hold and the angle G between the great circle route and true North are calculated when the Equations 1, 2, 3, 4, 7, 8, 9, and 10 are simultaneously solved by the analog computer shown in FIG. 5.

Referring to FIG. 5, the manual inputs comprise the latitude-longitude location of the base $Lab$, $Lob$ respectively by means of knobs 11, 12; the latitude-longitude location of the destination $Lad$, $Lod$ respectively by means of knobs 13, 14; the true airspeed $Va$ by means of knob 15; the wind velocity $Vw$ by means of knob 16; and the wind direction $Dw$ by means of knob 17.

It is to be understood that the inputs need not be inserted manually but can be inserted by other conventional means.

Ordinarily, before the trip is undertaken, it is desirable to determine the great circle route between the latitude-longitude positions of the base and the destination by determining the angle G between the great circle route and true North so that a navigational heading H can be established. Consequently, the base and destination positions are inserted into the computer by means of the knobs 11, 12, 13, 14 and the heading H and angle G are calculated. The heading H is based upon the angle G but with the wind direction $Dw$ and velocity $Vw$ compensated for.

More particularly, referring to FIG. 5, the knobs 11, 12 are adjusted to the base's latitude and longitude, respectively, and the knobs 13 and 14 are adjusted to the latitude and longitude, respectively, of the destination. The actual longitude $Loa$ is the same as the base longitude $Lob$ at the start of the trip and is registered on an instrument panel 20. Both of the input knobs 12, 14 are mechanically connected to mechanical differentials 21, 22, respectively, having common connect shaft means 23 connected to a dial indicator 24 in the panel 20.

The differential 22 is also mechanically connected to and drives a rotor of a resolver 25 for adjusting the same to a value of $Lod - Loa$. The rotor or input coil of the resolver 25 is energized by a pickoff cosine coil in a resolver 26, both of the coils are grounded, FIG. 5. A rotor coil of the resolver 26 is energized from a standard power supply, the rotor of the resolver 26 being mechanically adjusted by the destination latitude $Lad$ knob 13. The input to the rotor of the resolver 25, therefore, has a voltage representative of $\cos Lad$.

Accordingly, the voltage signal induced into the sine coil of the resolver 25 is proportional to $$\sin (Lod - Loa) \cos Lad$$

which signal is fed into an amplifier 27 for a purpose to be described.

The cosine coil of the resolver 25 picks off a voltage proportional to $\cos (Lod - Loa) \cos Lad$, which is supplied to an amplifier 28 in a multiplier unit 30. The output of the amplifier 28 drives a motor 31, which mechanically adjusts the wipers 32, 33 of two centertapped potentiometers 34, 35, respectively. The potentiometer 35 is connected to a grounded cosine coil in a resolver 36. The rotor coil of the resolver 36 is energized by a standard power supply, the rotor of the resolver 36 being angularly adjusted proportional to $Laa$ through a mechanical arrangement 39 from a mechanical differential 37. The differential 37 is adjusted by the $Lab$ knob 11 and a motor 38 driven by voltage supplied from an integrator 40, which will be described, for providing angular movement proportional to the instantaneous actual vehicle latitude $Laa$.

Accordingly, the cosine coil of the resolver 36 has an induced voltage signal proportional to cos $Laa$. The potentiometer 35 serves as a multiplier and the wiper 33 picks off a voltage proportional to $$\cos Laa \cos Lad \cos (Lod-Loa)$$

and feeds the latter voltage signal to an amplifier 41.

The output of the amplifier 28 of the multiplier 30 is nulled by the motor 31 adjusting the wiper 32 to a nulling position on the potentiometer 34, which is energized from a standard A.C. power supply.

The output of the amplifier 41 drives a mechanical shaft arrangement 42 via a motor 43 for obtaining an angular shaft displacement proportional to the length A of the great circle path between the vehicle's present position and the destination. However, there is an additional signal input to the amplifier 41 having a voltage proportional to sin $Laa$ sin $Lad$. The latter voltage is obtained from a multiplier 50, similar to the multiplier 30. More particularly, the voltage output signal sin $Laa$ sin $Lad$ is obtained from a wiper 51 of a centertapped potentiometer 52 connected to a grounded sine coil of the resolver 36. The sine coil picks off a voltage signal proportional to sin $Laa$ and the wiper 51 is positioned through a mechanical linkage 53 positioned by a motor 54 which is connected to the output of an amplier 55. The amplifier 55 is supplied with a voltage signal proportional to sin $Lad$ from a grounded sine coil of the resolver 26. The voltage signal to the motor 54 is nulled through a centertapped potentiometer 56 having a wiper 57 positioned by the linkage 53 for picking off a voltage signal of a magnitude sufficient for nulling the output of the amplifier 55. The nulling of the amplifiers 28 and 55 is necessary so that the wipers 33 and 51 are accurately positioned so that a resistance is inserted into circuit for producing a signal proportional to cos $(Lod-Loa)$ cos $Lad$ and sin $Lad$, respectively.

Multiplier 30 supplies through wiper arm 33 an input voltage to amplifier 41 proportional to $$\cos Laa \cos Lad \cos (Lod-Loa)$$

which is one term of Equation 4. Multiplier 50 supplies through wiper arm 52 a second input voltage to amplifier 41 proportional to sin $Laa$ sin $Lad$ which is the other term of Equation 4. Amplifier 41 sums the above mentioned terms of Equation 4 and drives motor 43 an amount proportional to the arc A. Motor 43 accordingly positions the rotor of resolver 60 an amount proportional to the arc A. Since the rotor of resolver 60 is also electrically energized by a source of A.C. voltage, the cosine coil of resolver 60 has induced in it a signal proportional to cos $A$ (the left hand side of Equation 4) which is fed back to amplifier 41 and thereby nulls the signal to motor 43.

The value of A is useful for initially determining the distance $Dbd$ from the base to the destination, since the vehicle is assumed to be still at the base for the purpose of initially obtaining the angle G. Should the prevailing wind conditions at cruising altitude be known, the heading H can also be initially computed in a manner to be described.

A dial indicator 61 is provided in the panel 20 for indicating $Dbd$. The reading is initially accomplished by engaging a clutch 62 in a conventional manner, not shown, and connecting a mechanical shaft linkage 63 with the linkage 42. The linkage 63 drives the indicator 61 through a gear box 64 necessary for multiplying the value of A by 60 for obtaining 60 A so that the indicator 61 will read in nautical miles.

After indicator 61 is set, the clutch 62 is disengaged and a similar clutch 65 is engaged and remains engaged throughout the trip. A mechanical differential 66 is driven by shaft arrangement 42 as well as by the shaft arrangement 63 for obtaining $Dbd-Dad=Dab$ as set forth in Equation 2. $Dab$ is registered on an indicator 67 in the panel 20 after the signal is converted to read directly in nautical miles by a multiplying gear box 59, similar to the gear box 64.

An additional indicator 68 is provided in the panel 20 to register $Dad$. Indicator 68 is driven by a shaft arrangement 69 through a multiplying gear box 58, the shaft 69 being directly connected to the shaft arrangement 42 via the clutch 65.

The initial computations are completed by nulling the output of the amplifier 27 and thereby stopping a motor 70, which positions a mechanical shaft linkage 71 at an angle proportional to the angle G between North and the great circle route. As pointed out, the input signal to the amplifier 27 is proportional to sin $(Lod-Loa)$ cos $Lad$ and is induced in the sine pickoff coil in the resolver 25.

The nulling of the amplifier 27 is accomplished by inducing voltage in a sine pickoff coil in a resolver 72 having a grounded rotor coil supplied with a sin $A$ voltage signal from a grounded sine pickoff coil in the resolver 60. The nulling voltage signal to the amplifier 27 is proportional to sin $A$ sin $G$ since the rotor of the rotor coil of the resolver 72 is positioned by the motor 70 an amount proportional to the value of the angle G in accordance with Equation 3.

The angle of G is registered in the panel 20 by means of an indicator 74 driven by the linkage 71 coupled to the rotor of resolver 72.

The initial computations being completed, the $Dbd$ indicator 61 indicates the distance to the destination from the base; the $Dab$ indicator 67 registers zero; the $Dad$ indicator 68 reads the same as the indicator 61; the course angle G indicator 74 provides the initial angle G which is usually constantly changing throughout the trip; the $Loa$ indicator 24 register a longitude identical to the base longitude $Lob$; and an $Laa$ indicator 75 in the panel 20 driven by linkage 39 registers a latitude identical to the base latitude.

Once the trip is underway, the latitude-longitude position is dependent upon the ground speed $Vg$. The heading H of the vehicle may have to be adjusted to prevailing wind conditions in order to keep the vehicle on course.

As soon as the values of $Vw$ and $Dw$ are known, the knobs 16, 17, respectively, are adjusted so that the heading H can be computed and registered on a course heading H indicator 76 in the panel 20. A mechanical differential 77 is driven from the angle G linkage 71 and the wind direction $Dw$ knob 17 for adjusting a rotor in a rotor coil of a resolver 78 to a value proportional to $Dw-G$, the rotor coil of the resolver 78 being connected to a standard power supply.

The heading H indicator 76 is connected by a mechanical linkage 80 to a motor 81 energized from the output of an amplifier 82. The input to the amplifier 82 comes from the voltage signal induced into a sine pickoff coil in the resolver 78, which pickoff voltage signal of sin $(Dw-G)$ is altered to $Vw$ sin $(Dw-G)$ by a grounded centertapped potentiometer 83 having a wiper 84 positioned by the $Vw$ knob 16. The potentiometer 83 serves as a multiplier.

With the input proportional to $Dw-G$ to the rotor of resolver 78, the sine coil of resolver 78 supplies amplifier 82 with a signal proportional to $Vw$ sin $(Dw-G)$ (a term in Equation 10) by virtue of wiper arm 84 being positioned according to wind speed $Vw$. Amplifier 82 drives motor 81 an amount proportional to the heading angle H. Differential 85 combines the heading angle H and the course angle G and provides a mechanical input to the rotor of resolver 87 representative of the quantity $H-G$. Since wiper arm 88 has been moved an amount proportional to airspeed $Va$, the output taken off resistance 89 of the sine coil of resolver is proportional to $$Va \sin (H-G)$$

(the other term of Equation 10). This quantity is applied as an input to amplifier 82 to null the output thereof but only after motor 81 has moved an amount proportional to the quantity H.

The solution of Equations 9 and 10 is a simultaneous solution of equations and it should be understood that the solution for ground speed $Vg$ of Equation 9 occurs concurrent with the solution of Equation 10.

The ground speed $Vg$ is shown on the panel by means of an indicator 90. A motor 91 positions the $Vg$ indicator 90 through a mechanical linkage 92, the electrical energy to the motor 91 being supplied from the output of an amplifier 93. The signal input to the amplifier 93 is proportional to $Vw \cos (Dw-G)$ and is obtained from a cosine pickoff coil in the resolver 73 as modified by positioning a wiper 94 of a grounded centertapped potentiometer 95 with the positioning of the $Vw$ knob 16.

The output of the amplifier 93 is nulled by supplying a voltage signal proportional to $Va \cos (H-G)$ to the amplifier 93. This is understood by referring to Equation 10 wherein the sum of the terms $Va \cos (H-G)$ and $Vw \cos (Dw-G)$ is equal to zero. The nulling voltage of $Va \cos (H-G)$ is obtained from the cosine pickoff coil in the resolver 87 as modified by the positioning of a wiper 96 of a grounded centertapped potentiometer 97. The wiper 96 is positioned by adjusting the $Va$ knob 15.

The instantaneous actual or present latitude-longitude position of the vehicle is computed and indicated on the instrument panel as follows.

The actual latitude $Laa$ position, as represented by the angular movement of linkage 39, is obtained by supplying the integrator 40 with a voltage signal proportional to $Vg \cos G$. The voltage $Vg \cos G$ is obtained by means of a resolver 100 having a rotor coil connected to the $Vg$ voltage output of the amplifier 93 and a rotor positioned by the G linkage 71. A grounded cosine pickoff coil 101 supplies the $Vg \cos G$ voltage signal to the integrator 40. Since the signal to the differential 37 from the motor 38 must be $\frac{1}{60} \int Vg \cos G$, the factor of $\frac{1}{60}$ can be interposed in the integrator 40, the motor 38, or preferably the differential 37.

The actual longitude position $Loa$ is obtained by driving the differential 21 from the drive shaft of a motor 102 electrically energized with power from an integrator 103. The other input to the differential 21 is manually added by adjusting the $Lob$ knob 12. The integrator 103 integrates an electrical signal proportional to the term $Vg \sin G \sec Laa$ found in Equation 8.

The signal to the integrator 103 is obtained in the following manner. A grounded pickoff sine coil 104 in the resolver 100 supplies a voltage signal proportional to $+Vg \sin G$. Although there are known mechanical means for obtaining a secant, preferably a voltage proportion to $Vg \sin G \sec Laa$ is obtained by using a cosine pickoff coil 105 of a resolver 106. The resolver 106 is provided with a grounded rotor coil 107 having a rotor adjusted by the $Laa$ linkage 39. The sine pickoff coil 104 of the resolver 100 is connected to the input side of a high gain amplifier 108 which builds up an output signal in the rotor coil 107 sufficient to cause a signal equal to $Vg \sin G$ to be induced in the cosine coil 105, but opposite in sign, for opposing the input to the amplifier 103 from the coil 104, the signal from coil 105 being connected in opposition to the signal from coil 104 at a point 110.

In order for a signal proportional to $-Vg \sin G$ to be induced in the cosine coil 105, the rotor coil 107 must have a signal generated therein proportional to $$Vg \sin G \frac{1}{\cos Laa}$$

which is the same as $Vg \sin G \sec Laa$.

Moreover, the output obtained from the high gain amplifier 108 and supplied to the integrator 103 by the foregoing arrangement remains the same so long as the $Laa$ linkage 39 remains stationary, but movement of the rotor in the rotor coil 107 causes the inducement of a voltage signal in the signal from coil 107 proportional to term $Vg \sin G \sec Laa$, and accordingly, the instant $Laa$ latitude appears on the indicator 75.

It is to be understood that various modifications are contemplated and can obviously be obtained by those skilled in the art without departing from the spirit and scope of the invention, as hereinafter defined by the appended claims.

What is claimed is:

1. A present position longitude computer for the great circle navigation of an aircraft from a starting point along a great circle route to a destination, integrator means, first resolver means having a rotor coil energized by a signal proportional to the ground speed of the vehicle and having a rotor angularly positioned proportional to the course angle between the great circle route and North, high gain amplifier means, said first resolver means having a sine coil connected to feed a signal to said high gain amplifier means proportional to a product of the ground speed magnitude and the sine of the course angle, second resolver means having a grounded rotor coil connected to the output of said high gain amplifier means and to said integrator means and having a rotor in said rotor coil angularly positioned proportional to the present latitude position, means angularly positioning said rotor of said second resolver means, said second resolver means having a grounded cosine coil connected to said sine coil of said first resolver means and in opposition thereto, said high gain amplifier means building up an output signal proportional to a product of the ground speed of the aircraft and the sine of the course angle and the secant of the present position latitude, said cosine coil of said second resolver means picking off a nulling signal from said rotor coil of said second resolver means and nulling the input to said high gain amplifier means when said output signal reaches a necessary magnitude, said integrator means integrating said signal, means for adding the output of said integrator means and the longitude of the starting point for obtaining a sum proportional to the present longitude of the vehicle, and means for introducing a signal proportional to said starting point longitude into said adding means.

2. A present position longitude computer for the great circle navigation of an aircraft from a starting point along a great circle route to a destination, high gain amplifier means, signal generating means supplying an input signal to said high gain amplifier means proportional to a product of a ground speed magnitude and the sine of the course angle between the great circle path and North, first resolver means having a rotor in a grounded rotor coil and a grounded cosine coil, means continuously angularly positioning said rotor proportional to the present position latitude, said cosine coil means being connected in opposition to the input signal of said signal generating means, said high gain amplifier means having an output connected to said rotor coil means and building up a signal output to a level proportional to a product of the ground speed of the aircraft and the sine of the angle between North and the direction of travel of the vehicle and the secant of the present position latitude at which instance said cosine coil picks off a nulling signal of a level sufficient to null the input to said high gain amplifier means, integrator means connected to the output of said high gain amplifier means and integrating said output signal, means for adding the output of said integrating means and the longitude of the starting point for obtaining a sum proportional to the present longitude of the vehicle, and means for introducing a signal proportional to said starting point longitude into said summing means.

3. A computer for the great circle navigation of an aircraft from any starting point along a great circle route to a predetermined destination comprising, means for introducing latitudes and longitudes of the starting point and the destination, means for continuously introducing the true airspeed of the aircraft and the wind speed and direction, means for producing first signal means proportional to the product of the cosine of the present latitude and the cosine of the destination latitude and the cosine of the difference between the destination and the present longitudes, means for producing second signal means proportional to the product of the sines of the present latitude and the destination latitude, first motor means, first amplifier means having an output driving said first motor means, and said first and second signal means connected as an input to said first amplifier means, first resolver means having an input rotor coil energized from a standard power supply and a rotor disposed within said rotor coil driven by said first motor means, said first resolver means having a grounded cosine coil connected as an input to said first amplifier means and adapted to null the output of said first amplifier means when said rotor of said first resolver means is turned through an angle proportional to the great circle course distance, second motor means, second amplifier means having an output in driving connection with said second motor means, means for supplying a third signal means to the input of said second amplifier means proportional to the product of said wind speed and a sine of the angular difference between the wind direction and the great circle route direction, means for supplying fourth signal means to the input of said second amplifier means proportioned to the product of said true air speed of the aircraft, and the sine of the angular difference between the aircraft heading to hold and the direction of the great circle route, said second motor means having a drive shaft adapted to be moved through an angle proportional to the angle between said heading to hold and North, said output of said second amplifier means being nulled when the sum of said third and fourth signal means is zero, third motor means, third amplifier means having an output in driving connection with said third motor means, means for supplying fifth signal means to said third amplifier means proportional to the product of said true air speed and the cosine of the angular difference between the aircraft heading to hold and the direction of the great circle route, means for supplying sixth signal means to said third amplifier means proportional to the product of said wind speed and the cosine of the angular difference between the wind direction and the direction of the great circle route, said output of said third amplifier means being proportional to the sum of said fifth and sixth signal means and proportional to the ground speed of the aircraft, integrator means, means for generating seventh signal means proportional to a product of the ground speed of the vehicle and the cosine of the angle between the great circle route and North, means for introducing said seventh signal means to said integrator means, said integrator means integrating said seventh signal means, first summing means for summing the output of integrator means and the latitude of the starting point for obtaining a sum proportional to the present latitude position of the vehicle, said integrator means being connected to said summing means, first mechanical means for introducing said starting point latitude into said first summing means, means for generating eighth signal means proportional to a product of the ground speed of the aircraft and the sine of the angle between North and the direction of travel of the aircraft and the secant of the present position latitude, means for integrating said signal, second summing means for adding the output of said integrating means and the longitude of the starting point for obtaining a sum proportional to the present longitude of the aircraft, and second mechanical means for introducing a signal proportional to said starting point longitude into said second summing means.

4. A computer for the great circle navigation of an aicraft from a known starting point to a known destination comprising, first mechanical differential means, first shaft means for introducing the destination longitude into said first differential means, second shaft means continuously introducing the present position longitude into said first mechanical differential means, second mechanical differential means, third shaft means for introducing the starting point longitude into said second mechanical differential means, fourth shaft means for continuously introducing into said second mechanical differential means, shaft rotation proportional to the degrees longitude traversed by the aircraft between the starting point and the destination thereof, the output of said second mechanical differential means connected to and driving said second shaft means, first resolver means having a grounded input rotor coil with a rotor therein and a grounded sine pickoff coil and a grounded cosine pickoff coil, fifth shaft means connecting the output of said first mechanical differential means with the rotor of said first resolver means and positioning the rotor to an angle proportional to the difference between the destination longitude and the present position longitude, second resolver means having a rotor input coil connected to a standard power supply and having a rotor in the rotor coil and a grounded sine coil and a grounded cosine coil, sixth shaft means connected to said rotor of said second resolver means for turning the same to an angle proportional to the destination latitude, said rotor coil of said first resolver means being connected to the cosine coil of said second resolver means for having a signal introduced therein proportional to the cosine of the destination latitude, first amplifier means, first motor means connected to and driven by the output of said first amplifier means, first multiplier means, said cosine pickoff coil of said first resolver means connected as an input to said first multiplier means for supplying a signal thereto proportional to the product of the cosine of the destination latitude and the cosine of the difference between the destination and the present position longitudes, third resolver means having an input rotor coil energized from a standard power supply and with a rotor therein and a cosine coil and a sine coil, third mechanical differential means, seventh shaft means for introducing a shaft rotation proportional to the starting point latitude into said third mechanical differential means, eighth shaft means connected as an input to said third mechanical differential means, shaft driving means connected as an input to said eighth shaft means providing a shaft rotation proportional to the degrees latitude traversed by the aircraft between the starting point and the present position, ninth shaft means connecting the output of said third mechanical differential means and the rotor of said third resolver means and positioning the rotor to an angle proportional to the present position latitude, said cosine coil of said third resolver means connected as an input to said first multiplier means, the output of said first multiplier means connected as an input to said first amplifier means, second multiplier means, the sine coil of said second resolver means connected as an input to said second multiplier means, the sine coil of said third resolver means connected as an input to said second multiplier means, the output of said second multiplier means connected to the input of said first amplifier means, fourth resolver means having an input rotor coil connected to a standard electrical power supply and having a rotor therein and a grounded sine coil and a grounded cosine coil, said rotor of said fourth resolver means being angularly positioned by said first motor means, the cosine coil of said fourth resolver means being connected as an input to said first amplifier means and in opposition to said inputs from said first and second multiplier means for nulling the output of said amplifier means when the rotor of said fourth resolver means is positioned to an angle proportional to the great circle course distance between the present position and the destination.

5. A computer as set forth in claim 4, further comprising, second amplifier means, second motor means driven by the output of said second amplifier means, the sine coil of said first resolver means connected as an input to said second amplifier means, and fifth resolver means having a grounded input rotor coil having a rotor therein and connected to the sine coil of said fourth resolver means, said fifth resolver means having a grounded sine coil connected to the input of said second amplifier means, and the rotor of said fifth resolver means being driven and angularly positioned by said second motor means, and when the rotor is turned through an angle proportional to the present position great circle course heading the output of said second amplifier means is nulled.

6. A computer as set forth in claim 5, further comprising, fourth and fifth mechanical differential means, tenth shaft means driven by said second motor means and connected as a course angle input to said fourth and fifth mechanical differential means, eleventh shaft means for introducing the wind direction into said fifth mechanical differential means, sixth resolver means having an input rotor coil connected to a standard electrical power supply and having a rotor therein angularly positioned by the output of said fifth mechanical differential means to an angle proportional to the angular difference between the wind direction and the course angle, said sixth resolver means having a centergrounded sine coil and a centergrounded cosine coil, first and second centertapped potentiometer means respectively connected to the sine and cosine coils of said sixth resolver means, wind speed input means connected to each of the wipers of said first and second potentiometer means for adjusting the same, third amplifier means, said wiper of said first potentiometer means picking off a signal and supplying the same to the input side of said third amplifier means, seventh resolver means having an input rotor coil connected to a standard electrical power supply and having a rotor therein and a centergrounded sine coil and a centergrounded cosine coil, the rotor of said seventh resolver means being connected to and angularly positioned by the output of said fourth mechanical differential means, third motor means driven by the output of said third amplifier means, twelfth shaft means driven by said third motor means and connected as an input to said fourth mechanical differential means, third and fourth centertapped potentiometer means respectively connected to the sine and cosine coils of said seventh resolver means and having wipers adapted to be adjusted to a position proportional to the true airspeed of the aircraft, and thirteenth shaft means connected to the wipers of said third and fourth potentiometer means for positioning the same according to the true airspeed of the aircraft, and the wiper of said third potentiometer means picking off a signal and supplying the same to the input side of said third amplifier means and nulling the output of said third amplifier means when said twelfth shaft means is positioned at an angle proportional to the aircraft heading to hold angle at the present position.

7. A computer as set forth in claim 6, further comprising, fourth amplifier means having input means connecting the wipers of said second and fourth potentiometer means and respectively picking off signals proportional to the product of the wind speed and the cosine of the angular difference between the wind direction and the course angle and the product of the true airspeed and the cosine of the angular difference between the heading to hold and the course angle, and the output of said fourth amplifier means being proportional to the ground speed of the aircraft.

8. A computer as set forth in claim 7 further comprising, eighth resolver means having a grounded input rotor coil connected to the output of said fourth amplifier means and having a rotor in the rotor coil connected to and angularly positioned by said tenth shaft means to an angle proportional to the present position course angle, first integrator means, said eighth resolver means having a grounded cosine coil connected as an input to said first integrator means and picking off a signal proportional to the product of the ground speed of the aircraft and a cosine of the course angle, and fourth motor means connected to and driven by the output signal of said first integrator means, said fourth motor means driving said eighth shaft means.

9. A computer as set forth in claim 8 further comprising, fifth amplifier means, said eighth resolver means having a grounded sine coil connected as an input to said fifth amplifier means, ninth resolver means having a grounded input rotor coil connected to the output of said fifth amplifier means and having a rotor in the rotor coil connected to and driven by said ninth shaft means to an angular position proportional to the present position latitude, second integrator means also connected to the output of said fifth amplifier means and adapted to integrate a signal proportional to the product of the ground speed and the sine of the course angle and the secant of the present position latitude, said ninth resolver means having a grounded cosine coil connected to the input of said fifth amplifier means and in opposition to the other input signal thereto from the sine coil of said eighth resolver means for nulling the output of said fifth amplifier means when the output thereof is sufficient to cause a signal to be induced into the cosine coil of said ninth resolver means proportional to the product of the ground speed and the sine of the course angle, and fifth motor means driven by the output of said second integrator means, and said fourth shaft means being angularly positioned by said fourth motor means.

10. A computer as set forth in claim 9 further comprising, instrument panel means, course angle indicator means in said instrument panel means and driven by said tenth shaft means, present latitude indicator means in said instrument panel means and driven by said ninth shaft means, present longitude indicator means in said instrument panel means and driven by said second shaft means, aircraft heading-to-hold indicator means in said instrument panel means and driven by said twelfth shaft means, ground speed indicator means in said instrument panel means, sixth motor means connected to the output of said fourth amplifier means, and thirteenth shaft means interconnecting said sixth motor means and said ground speed indicator means.

11. A computer as set forth in claim 4 further comprising, instrument panel means, fourteenth shaft means driven by said first motor means, distance remaining to the destination indicator means in said instrument panel means and adapted to be engaged with and driven by said fourteenth shaft means, sixth mechanical differential means having an input connected to said fourteenth shaft means, fifteenth shaft means adapted to be temporarily connected to another input of said sixth mechanical differential at the starting point of the great circle trip when the total distance to destination is calculated, said sixth mechanical differential means being engaged with said fourteenth shaft means after computing the total trip distance and said fifteenth shaft means has been disengaged, total trip distance indicator means in said instrument panel means and driven by said fifteenth shaft means, distance traveled indicator means in said instrument panel, and sixteenth shaft means interconnecting said distance traveled indicator means, with the output of said sixth mechanical differential means wherein the distance remaining to the destination is constantly being subtracted from the computed total trip distance.

12. A great circle navigation computer-display for continuously computing and displaying the instantaneous latitudes and longitudes of an aircraft flying from a base to a destination, comprising in combination: ground speed computer means, first mechanical means supplying mechanical inputs to said computer means proportional to aircraft airspeed, wind speed, and wind direction, said computer means having a first output signal proportional to aircraft ground speed and a second output signal proportional to heading, resolver means connected to receive said first output signal from said computer means, said resolver means having a mechanical input proportional to the course angle between the great circle route from base to destination and north, said resolver means generating a first output signal proportional to the product of aircraft ground speed and the cosine of said angle, first integrator means connected to integrate said first output signal, a first differential connected to receive said integrated first output signal as a first input, said differential connected to receive a second input proportional to base latitude and having an output proportional to instantaneous latitude of the aircraft; said resolver means connected to receive said output proportional to instantaneous latitude as an input and generating a second output signal proportional to the product of aircraft ground speed, the sine of said course angle, and the secant of the instantaneous latitude of the aircraft, second integrator means connected to integrate said second output signal, a second differential connected to receive said integrated second output signal as a first input, said second differential having a second input proportional to instantaneous longitude of the aircraft, indicating means connected to receive said outputs from said first and second differentials for continuously indicating said instantaneous longitudes and latitudes of the aircraft as it flies from a base to a destination.

13. Ground speed computer means as claimed in claim 12, further comprising: first resolver means, a first resolver rotor coil electrically energized from a source of A.C. voltage, first mechanical input means for rotating said first resolver rotor coil an amount proportional to a first difference angle between the wind direction angle and said course angle, a first resolver sine coil having an input proportional to wind speed and an electrical output proportional to the product of wind speed and the sine of said first difference angle, a first resolver cosine coil having an input proportional to said wind speed and an electrical output proportional to the product of said wind speed and the cosine of said first difference angle; second resolver means, a second resolver rotor coil electrically energized from said source, second mechanical input means for rotating said second resolver rotor coil an amountt proportional to a second difference angle between a heading angle and said course angle, a second resolver sine coil having an input proportional to airspeed and an electrical output proportional to the product of said airspeed and the sine of said second difference angle, a second resolver cosine coil having an input proportional to airspeed and an electrical output proportional to the product of said airspeed and the cosine of said second difference angle; first amplifier means connected to receive as inputs said electrical outputs from the respective sine coils of said first and second resolver means, said first amplifier means having an output proportional to said heading angle; second amplifier means connected to receive as inputs said electrical outputs from the respective cosine coils of said first and second resolver means, said second amplifier means having an output proportional to ground speed of the aircraft.

14. A great circle navigation computer-display for continuously computing and displaying the instantaneous position of an aircraft enroute from a base to a destination, comprising in combination: ground speed computer means, means supplying said computer means inputs proportional to aircraft airspeed, wind speed and wind direction, said computer means having a first output signal proportional to aircraft ground speed and a second output proportional to heading, resolver means connected to said computer means to receive said first computer output signal, mechanical input means supplying said resolver means an input proportional to a course angle, said course angle being subtended between the great circle route from base to destination and north, first output means from said resolver means carrying a first output signal proportional to the product of aircraft ground speed and the cosine of said course angle, first integrator means connected to said first output means for integrating said first output signal, first differential means connected to receive said integrated first output signal as one input, said first differential means having a second input proportional to base latitude and an output proportional to the instantaneous latitude of the aircraft; second output means from said resolver means carrying a second output signal proportional to the product of aircraft ground speed, the sine of said course angle, and the secant of the instantaneous latitude of the aircraft, second integrator means connected to said second output means for integrating said second output signal, second differential means connected to receive said integrated second output signal as one input, said second differential means having a second input proportional to base longitude and having an output proportional to the instantaneous longitude of the aircraft; first distance computer means connected to receive outputs proportional to instantaneous longitude and latitude as inputs, said first distance computer means having an output proportional to instantaneous distance to the destination, second distance computer means connected to receive said outputs proportional to instantaneous longitude and latitude as inputs, said second distance computer means having an output proportional to instantaneous distance from the base; indicator means connected to receive said outputs proportional to aircraft ground speed and heading, said outputs proportional to instantaneous longitude and latitude, said outputs proportional to instantaneous distance to the destination and distance from the base for continuously indicating said aircraft ground speed and heading, said instantaneous longitudes and latitudes, and said instantaneous distance to the destination and distance from the base of the aircraft enroute from the base to the destination.

15. Ground speed computer means, as claimed in claim 14, further comprising: first resolver means, a first resolver rotor coil electrically energized from a source of A. C. voltage, first mechanical input means for rotating said first resolver rotor coil an amount proportional to a first difference angle between the wind direction angle and said course angle, a first resolver sine coil having an input proportional to wind speed and an electrical output proportional to the product of wind speed and the sine of said first difference angle, a first resolver cosine coil having an input proportional to said wind speed and an electrical output proportional to the product of said wind speed and the cosine of said first difference angle; second resolver means, a second resolver rotor coil electrically energized from said source, second mechanical input means for rotating said second resolver rotor coil an amount proportional to a second difference angle between the heading angle and said course angle, a second resolver sine coil having an input proportional to airspeed and an electrical output proportional to the product of said airspeed and the sine of said second difference angle, a second resolver cosine coil having an input proportional to airspeed and an electrical output proportional to the product of said airspeed and the cosine of said second difference angle; first amplifier means connected to receive as inputs said electrical outputs from the respective sine coils of said first and second resolver means, said first amplifier means having an output proportional to said heading angle; second amplifier means connected to receive as inputs said electrical outputs from the respective cosine coils of said first and second resolver means, said second amplifier means having an output proportional to ground speed of the aircraft.

16. A great circle navigation system for continuously computing and displaying present position of an aircraft en route from a base to a destination, comprising in combination: an aircraft ground speed computer, first aircraft ground speed computer input means for inserting into said aircraft ground speed computer inputs proportional to the constant values of airspeed, wind direction, and wind speed, said aircraft ground speed computer having a first output proportional to aircraft ground speed and a second output proportional to heading, latitude and longitude computer means connected to said ground speed computer for receiving said output proportional to aircraft ground speed as an input, second input means for inserting into said latitude and longitude computer means inputs proportional to base longitude and latitude, said latitude and longitude computer means having a first output proportional to instantaneous latitude of the aircraft and a second output proportional to instantaneous longitude of the aircraft, a distance and course angle computer means connected to receive said aircraft instantaneous latitude and longitude outputs as inputs, third input means for inserting into said distance and course angle computer means an input proportional to destination longitude and latitude, said distance and course computer means having an output proportional to the great circle course angle serving as an input to said ground speed computer means, said distance and course angle computer having a second output proportional to the instantaneous distance from the destination and a third output proportional to the instantaneous distance from the base of the aircraft, indicator means connected to receive as inputs said outputs proportional to aircraft ground speed and heading, aircraft instantaneous longitude and latitude, aircraft instantantous distance from base and destination for continuously indicating the present position, the ground speed and heading, and the great circle course angle of the aircraft.

17. Ground speed computer means, as claimed in claim 16, further comprising: first resolver means, a first resolver rotor coil electrically energized from a source of A.C. voltage, first mechanical input means for rotating said first resolver rotor coil an amount proportional to a first difference angle between the wind direction angle and said course angle, a first resolver sine coil having an input proportional to wind speed and an electrical output proportional to the product of wind speed and the sine of said first difference angle, a first resolver cosine coil having an input proportionnal to said wind speed and an electrical output proportional to the product of said wind speed and the cosine of said first difference angle; second resolver means, a second resolver rotor coil electrically energized from said source, second mechanical input means for rotating said second resolver rotor coil an amount proportional to a second difference angle between the heading angle and said course angle, a second resolver sine coil having an input proportional to airspeed and an electrical output proportional to the product of said airspeed and the sine of said second difference angle, a second resolver cosine coil having an input proportional to airspeed and an electrical output proportional to the product of said airspeed and the cosine of said second difference angle; first amplifier means connected to receive as inputs said electrical outputs from the respective sine coils of said first and second resolver means, said first amplifier means having an output proportional to said heading angle; second amplifier means connected to receive as inputs said electrical outputs from the respective cosine coils of said first and second resolver means, said second amplifier means having an output proportional to ground speed of the aircraft.

18. In a great circle navigation computer for an aircraft, ground speed computer means, comprising in combination: first multiplier means, first input means applying an input to said first multiplier means proportional to a first difference angle between a wind direction angle and the great circle course angle, second input means applying an input to said first multiplier means proportional to wind speed, first output means from said first multiplier means having an output proportional to the product of said wind speed and the sine of said first difference angle, second output means from said first multiplier means having an output proportional to the product of said wind speed and the cosine of said first difference angle; second multiplier means, third input means applying an input to said second multiplier means proportional to a second difference angle between a heading angle and said course angle, fourth input means applying an input to said second multiplier means proportional to airspeed, third output means from said second multiplier means having an output proportional to the product of said airspeed and the sine of said second difference angle, fourth output means from said second multiplier means having an output proportional to the product of said airspeed and the cosine of said second difference angle; first amplifier means, said first and third output means connected as input means to said first amplifier means, said first amplifier means having an output proportional to heading angle, second amplifier means, said second and fourth output means connected as input means to said second amplifier means, said second amplifier means having an output proportional to ground speed of the aircraft.

References Cited in the file of this patent
UNITED STATES PATENTS

| | | |
|---|---|---|
| 2,688,440 | Gray et al. | Sept. 7, 1954 |
| 2,824,690 | Raymond | Feb. 25, 1958 |
| 2,862,661 | Goldman | Dec. 2, 1958 |
| 2,908,902 | Gray et al. | Oct. 13, 1959 |
| 2,943,321 | Karpeles | June 28, 1960 |
| 2,951,639 | McKenney et al. | Sept. 6, 1960 |